(12) United States Patent
Lee et al.

(10) Patent No.: US 11,636,723 B2
(45) Date of Patent: Apr. 25, 2023

(54) PERSONAL MOBILITY AND METHOD OF CONTROLLING THE SAME

(71) Applicants: Hyundai Motor Company, Seoul (KR); Kia Motors Corporation, Seoul (KR)

(72) Inventors: Jong Bok Lee, Gyeonggi-do (KR); Minjae Park, Gyeonggi-do (KR); Seunghyun Woo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 251 days.

(21) Appl. No.: 17/070,630

(22) Filed: Oct. 14, 2020

(65) Prior Publication Data

US 2021/0287478 A1  Sep. 16, 2021

(30) Foreign Application Priority Data

Mar. 13, 2020  (KR) .......................... 10-2020-0031409

(51) Int. Cl.

| | | |
|---|---|---|
| *B60L 58/10* | (2019.01) | |
| *B62K 11/02* | (2006.01) | |
| *B62J 45/20* | (2020.01) | |
| *B60L 3/00* | (2019.01) | |
| *G07F 17/00* | (2006.01) | |
| *B62H 1/02* | (2006.01) | |

(52) U.S. Cl.
CPC .......... *G07F 17/0057* (2013.01); *B60L 58/10* (2019.02); *B62H 1/02* (2013.01); *B62J 45/20* (2020.02); *B62K 11/02* (2013.01); *B60L 3/0046* (2013.01); *B60L 2200/24* (2013.01); *B60L 2250/12* (2013.01); *B60L 2260/22* (2013.01); *B62K 2202/00* (2013.01)

(58) Field of Classification Search
CPC ..................................................... B60L 2200/24
See application file for complete search history.

(56) References Cited

U.S. PATENT DOCUMENTS

| | | | | |
|---|---|---|---|---|
| 9,440,695 | B2* | 9/2016 | Dunham | ................. B62J 45/00 |
| 10,114,950 | B2* | 10/2018 | Nalluri | .................... G06F 21/51 |
| 10,304,341 | B1* | 5/2019 | Crasso | .................... H04W 4/46 |
| 11,215,981 | B2* | 1/2022 | VanderZanden | ........ B60R 25/24 |
| 11,263,690 | B2* | 3/2022 | VanderZanden | ....... G07C 5/008 |
| 2005/0149741 | A1 | 7/2005 | Humbel | |

FOREIGN PATENT DOCUMENTS

| | | | | |
|---|---|---|---|---|
| GB | 2545014 A | * | 6/2017 | ............... B62H 1/02 |
| JP | 2001-325629 A | | 11/2001 | |
| JP | 2007-331725 A | | 12/2007 | |
| JP | 2017143661 A | * | 8/2017 | |
| KR | 2018-0089431 A | | 8/2018 | |
| KR | 101980155 B1 | | 5/2019 | |

* cited by examiner

*Primary Examiner* — Jacob B Meyer
*Assistant Examiner* — Hosam Shabara
(74) *Attorney, Agent, or Firm* — Fox Rothschild LLP (57) ABSTRACT

A personal mobility that adjusts power supply based on a state of a kickstand is provided. The personal mobility includes a main body, a kickstand provided rotatably on one end in the main body, and a variable resistor that is provided on an axis of the kickstand as an axis. The variable resistor is configured to output a voltage that varies based on a position of the kickstand. A controller is then configured to adjust power supply when the position of the kickstand is a parking position.

20 Claims, 7 Drawing Sheets

| SELECTION | OPERATION |
|---|---|
| RETURN | POWER SUPPLY TERMINATE/DRIVING TERMINATE/PAYMENT PROGRESS |
| PAUSE | MINIMIZATION OF POWER CONSUMPTION/ADJUSTMENT OF USAGE FEE |

FIG. 7

PERSONAL MOBILITY AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0031409, filed on Mar. 13, 2020, the disclosure of which is incorporated by reference in its entirety.

TECHNICAL FIELD

The disclosure relates to a shared personal mobility and a method of controlling the same, and more particularly, to a personal mobility that adjusts power supply based on a state of a kickstand.

BACKGROUND

Recently, with an increase in the market for a personal mobility, which is an electricity-driven small transportation device, the number of people using a personal mobility is gradually increasing, and services for providing a shared personal mobility are also increasing. In general, a user may rent the shared personal mobility through a user terminal, and may return the shared personal mobility via the user terminal. When the user does not return through the user terminal after parking the shared personal mobility through a kickstand, an unintended usage fee may occur.

SUMMARY

An aspect of the disclosure is to provide a personal mobility that adjusts power supply based on a state of a kickstand, and a method of controlling the personal mobility. Additional aspects of the disclosure will be set forth in part in the description which follows and, in part, will be obvious from the description, or may be learned by practice of the disclosure.

In accordance with an aspect of the disclosure, a personal mobility may include a main body; a kickstand provided rotatably on one end in the main body; a variable resistor provided on an axis of the kickstand as an axis, configured to output a voltage that varies according to a position of the kickstand; and a controller configured to adjust power supply when the position of the kickstand is a parking position.

The personal mobility may further include a communicator. The controller may be configured to operate the communicator to transmit a message that confirms whether to return or pause the personal mobility to a user terminal when the position of the kickstand is the parking position. When receiving a message requesting to return the personal mobility, the controller may be configured to terminate the power supply. When receiving a message requesting to pause the use of the mobility device, the controller may be configured to minimize the power supply.

The controller may be configured to adjust at least one of a communication speed or a data type to be transmitted to minimize power consumption in the communicator. The personal mobility may further include a main battery; and an auxiliary battery configured to supply power to the communicator. The controller may be configured to pause the power supply from the main battery for charging the auxiliary battery. Additionally, the controller may be configured to pause the power supply from the main battery by opening a power supply switch connected to the main battery.

When receiving a message requesting to pause the use of the mobility device, the controller may be configured to adjust in a direction to decrease a usage fee per hour. When the position of the kickstand is changed from a parking position to a driving position, the controller may be configured to terminate adjustment to the power supply. The variable resistor may include a resistance line; and a slider provided to be rotatable in response to a rotation of an axis of the kickstand, configured to change the position connected to the resistance line according to the rotation.

In accordance with another aspect of the disclosure, in a method of controlling a personal mobility, the personal mobility includes a main body, a kickstand provided rotatably on one end in the main body, and a variable resistor provided on an axis of the kickstand as an axis, configured to output a voltage that varies according to a position of the kickstand. The method may include adjusting power supply when the position of the kickstand is in a parking position.

The personal mobility may further include a communicator. The adjusting of the power supply may include operating the communicator to transmit a message to confirm whether to return or pause the personal mobility to a user terminal when the position of the kickstand is the parking position. The adjusting of the power supply may include terminating the power supply when receiving a message requesting to return the personal mobility. The adjusting of the power supply may include minimizing the power supply when receiving a message requesting to pause the use of the personal mobility.

The minimizing of the power supply may include adjusting at least one of a communication speed or a data type to be transmitted to minimize power consumption in the communicator. The personal mobility may further include a main battery, and an auxiliary battery configured to supply power to the communicator. The minimizing of the power supply may include pausing the power supply from the main battery for charging the auxiliary battery. The minimizing of the power supply may include pausing the power supply from the main battery by opening a power supply switch connected to the main battery. The method may further include adjusting in a direction to decrease a usage fee per hour when receiving a message requesting to pause the use of the personal mobility.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Like numbers refer to like elements throughout this specification. This specification does not describe all components of the exemplary embodiments, and general information in the technical field to which the disclosure belongs or overlapping information between the exemplary embodiments is not described.

It should be understood that when a component is referred to as being "connected" to another component, it can be directly or indirectly connected to the other component. When a component is indirectly connected to another component, it may be connected to the other component through a wireless communication network. As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Reference numerals used in operations are provided for convenience of description, without describing the order of the operations. The operations can be executed in a different order from the stated order unless a specific order is definitely specified in the context. Hereinafter, embodiments of a personal mobility and a method of controlling the personal mobility according to aspects of the disclosure are described in detail with reference to the accompanying drawings.

Figure 1:
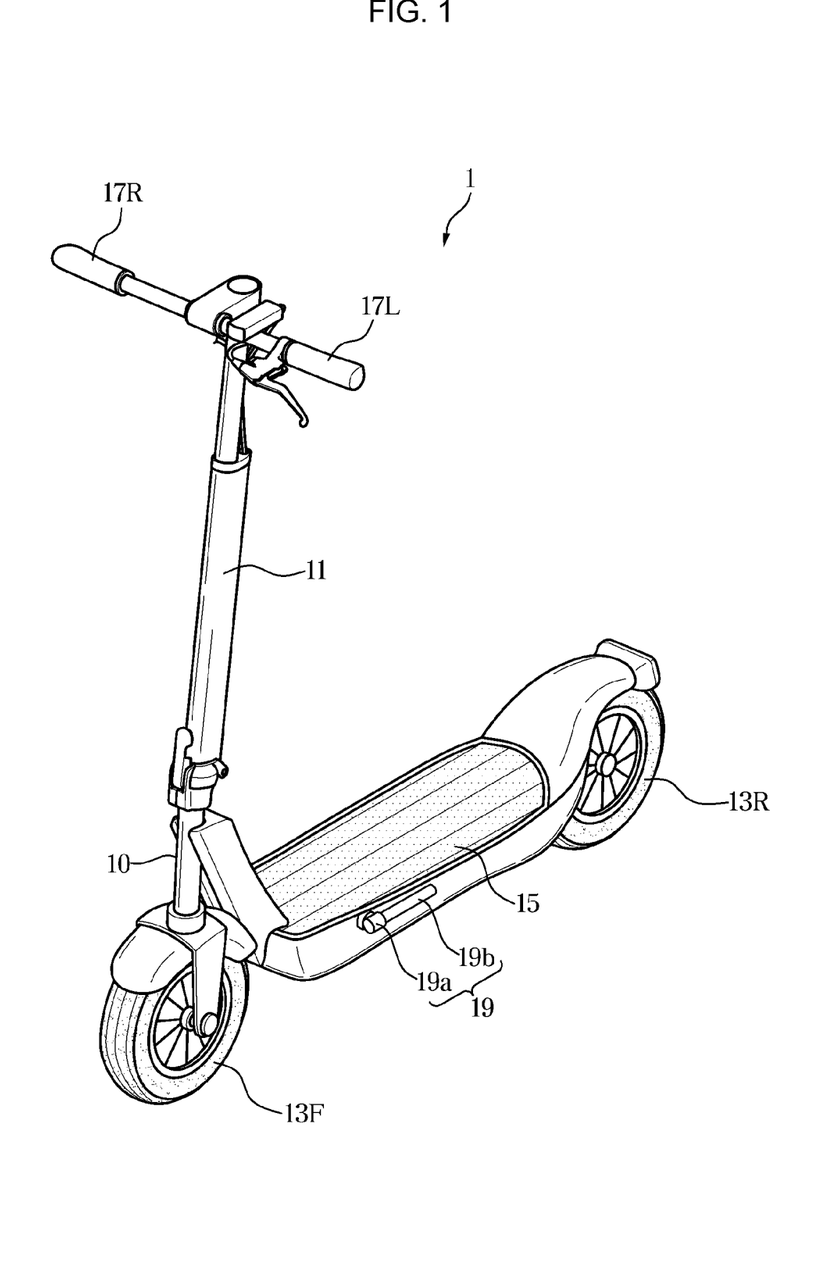
FIG. 1 is a view illustrating an appearance of a personal mobility according to an exemplary embodiment.

FIG. 1 is a view illustrating an appearance of a personal mobility according to an exemplary embodiment. A personal mobility according to an exemplary embodiment refers to a small mobility means for one person or two persons capable of driving with electric power such as an electric kickboard, an electric bicycle, and an electric wheel. For a detailed description, in the exemplary embodiment described below, a case in which personal mobility is an electric kickboard will be described as an example.

Referring to FIG. 1, a main body 10 of a personal mobility 10 may include a steering bar 11, a left handle 17L and a right handle 17R provided on the top of the steering bar 11, a front wheel 13F provided on the bottom of the body 11, a footrest 15 that extends from the bottom of the steering bar 11 to the rear of the front wheel 13F and a rear wheel 13R provided at the rear of the footrest 15.

A user of the personal mobility 1 may stand on a footrest 15 and drive while holding the left handle 17L and right handle 17R, and may adjust a driving direction by operating the left handle 17L and right handle 17R. Additionally, the main body 10 of the personal mobility 1 may include a kickstand 19 that supports the main body 10 when the personal mobility 1 is erected. For example, the kickstand 19 may be provided on the side of the footrest 15.

The kickstand 19 may be provided to be rotatable at one end on the main body 10. For example, the kickstand 19 may include a rotating shaft member 19a connected to the main body 10 and a body 19b that extends from the rotating shaft member 19a. In the kickstand 19, according to the user's operation, the body 19b may be disposed horizontally with a long axis of the footrest 15 while driving, and the body 19b may be disposed perpendicular to the long axis of the footrest 15 during parking to contact a ground. Hereinafter, a position horizontal to the long axis of the footrest 15 may be defined as a driving position of the kickstand 19, and a position perpendicular to the long axis of the footrest 15 may be defined as a parking position of the kickstand 19. The user of the personal mobility 1 may adjust the position of the kickstand 19 by applying a physical force to the kickstand 19 and rotating the rotating shaft member 19a.

Figure 2:
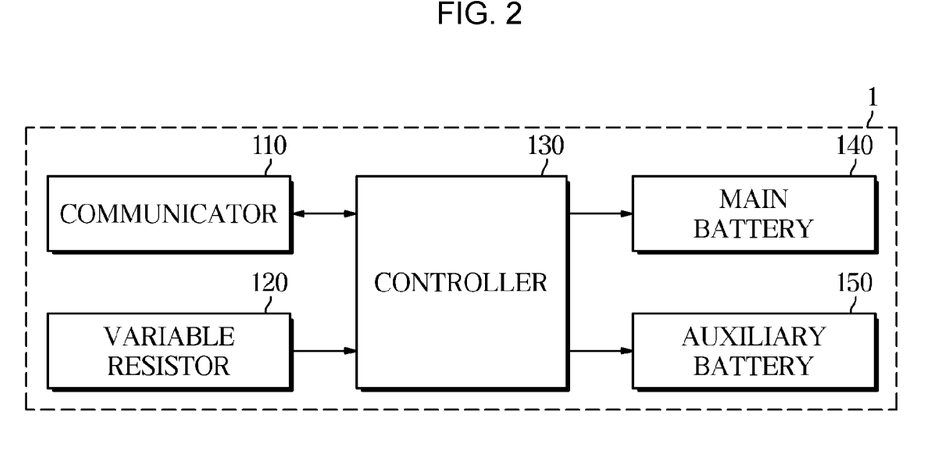
FIG. 2 is a control block diagram of a personal mobility according to an exemplary embodiment.

FIG. 2 is a control block diagram of a personal mobility according to an exemplary embodiment. Referring to FIG. 2, the personal mobility 1 may include a communicator 110 configured to communicate with an external device, a variable resistor 120 configured to output a voltage that changes based on the position of the kickstand 19, a controller 130 configured to execute a personal operation based on the position of the kickstand 19, a main battery 140 configured to supply power required for driving, and an auxiliary battery 150 configured to supply power to the communication module of the communicator 110.

However, each configuration of the personal mobility 1 illustrated in FIG. 2 may be omitted according to the exemplary embodiment, and the personal mobility 1 may further include a configuration other than the configuration illustrated in FIG. 2 according to the exemplary embodiment. The communicator 110 may be configured to transmit and receive data to and from an external electronic device via wireless communication, and for this purpose, may include a communication module of a known type. The communicator 110 may be configured to transmit and receive data to and from a server of a service provider that provides a rental service for the personal mobility 1, and may be configured to receive a message confirming that the personal mobility 1 has been rented or returned from the server.

In addition, the communicator 110 may be configured to transmit and receive data to and from a user terminal (e.g., smart phone, etc.) of the user who rented the personal mobility 1, and communicate directly via short-range communication (e.g., Bluetooth) or indirectly via the server. The variable resistor 120 may be provided on the axis of the kickstand 19 and may be configured to output a variable voltage that changes based on the position of the kickstand 19. In other words, the variable resistor 120 may be configured to output a first voltage when the kickstand 19 is located in the driving position, and may be configured to output a second voltage different in magnitude from the first voltage when the kickstand 19 is located in the parking position.

The controller 130 may be configured to determine the position of the kickstand 19 based on the output of the variable resistor 120. In other words, the controller 130 may be configured to determine whether the kickstand 19 is in the driving position or the parking position based on the magnitude of the voltage output from the variable resistor 120. The controller 130 may be configured to adjust power supply when the position of the kickstand 19 is the parking position.

Particularly, when the position of the kickstand 19 is the parking position, the controller 130 may be configured to operate the communicator 110 to transmit a message confirming whether to return or pause the personal mobility 1 to the user terminal of the user who rented the personal mobility 1. The controller 130 may be configured to terminate the power supply when receiving a message requesting return of the personal mobility. In other words, the controller 130 may be configured to terminate the power supply as part of the return to the personal mobility 1 when receiving a request to return the personal mobility 1 rented from the user terminal via the communicator 110.

Particularly, the controller 130 may be configured to terminate the power supply so that the personal mobility 1 does not operate even in the user's operation by turning off the main battery 140 that supplies power to a configuration necessary for driving, such as a power device (for example, a motor) of the personal mobility 1. For example, the controller 130 may be configured to turn off the main battery 140 by opening a power supply switch (e.g., ignition switch) connected to the main battery 140.

However, even in this case, the auxiliary battery 150 may be configured to supply power to the communicator 110, and through this, the communicator 110 may be configured to receive a rental confirmation message confirming that the personal mobility 1 from the server has been rented. The controller 130 may be configured to turn on the main battery 104 again based on receiving the rental confirmation message.

The controller 130 may be configured to minimize the power supply when receiving a message requesting a pause of personal mobility usage. In other words, the controller 130 may be configured to minimize the power supply by minimizing power consumption as part of the pause for driving when receiving a request for pause of driving of the personal mobility 1 from the user terminal through the communicator 110. Particularly, the controller 130 may be configured to minimize the power supply by minimizing the power consumption in the communicator 110 by adjusting at least one of a communication speed or a data type to be transmitted according to the exemplary embodiment.

In addition, the controller 130 may be configured to minimize power supply by pausing power supply from the main battery 140 for charging the auxiliary battery 150 according to the embodiment. The controller 130 may be configured to minimize the power supply by pausing the power supply from the main battery 140 by opening the power supply switch connected to the main battery 140. In response to receiving the message requesting to pause, the controller 130 may be configured to adjust a usage fee per hour to decrease. In other words, in response to receiving a request to pause driving of the personal mobility 1 from the user terminal via the communicator 110, the controller 130 may be configured to adjust the usage fee to be lower than the usage fee at the time of driving as part of the pause for driving.

For example, in response to receiving the message requesting to pause, the controller 130 may be configured to request the server to adjust the usage fee per hour in a decreasing direction. When returning the personal mobility 1, the server may be configured to calculate the usage fee when it is being paused to be lower than the usage fee when it is driving, and determine a total usage fee. When the position of the kickstand 19 is changed from the parking position to the driving position, the controller 130 may be configured to terminate adjustment of the power supply.

Particularly, the controller 130 may be configured to terminate the adjustment of the power supply to minimize the power supply when the kickstand 19 is changed from the parking position to the driving position after minimizing the power supply according to a pause request, and may be configured to operate the main battery 140 to supply power required for driving by normalizing the power supply. In other words, the controller 130 may be configured to operate the personal mobility 1 with the power supply before the pause request.

The controller 130 may include at least one memory in which a program for performing the above-described operations and operations described below is stored, and at least one processor for executing the stored program. In the case of a plurality of memory and processors, it may be possible that they are integrated in one chip, and it may be also possible to be provided in a physically separate position.

The main battery 140, under the operation of the controller 130, may be configured to supply power to components required for driving of the personal mobility 1 such as a motor, and may be connected to each component through a power supply switch. The auxiliary battery 150 may be configured to supply power to the communicator 110 and may be configured to supply power to the communicator 110 even when the personal mobility 1 is not being rented. In addition, the auxiliary battery 150 may be charged through the main battery 140.

Figure 3:
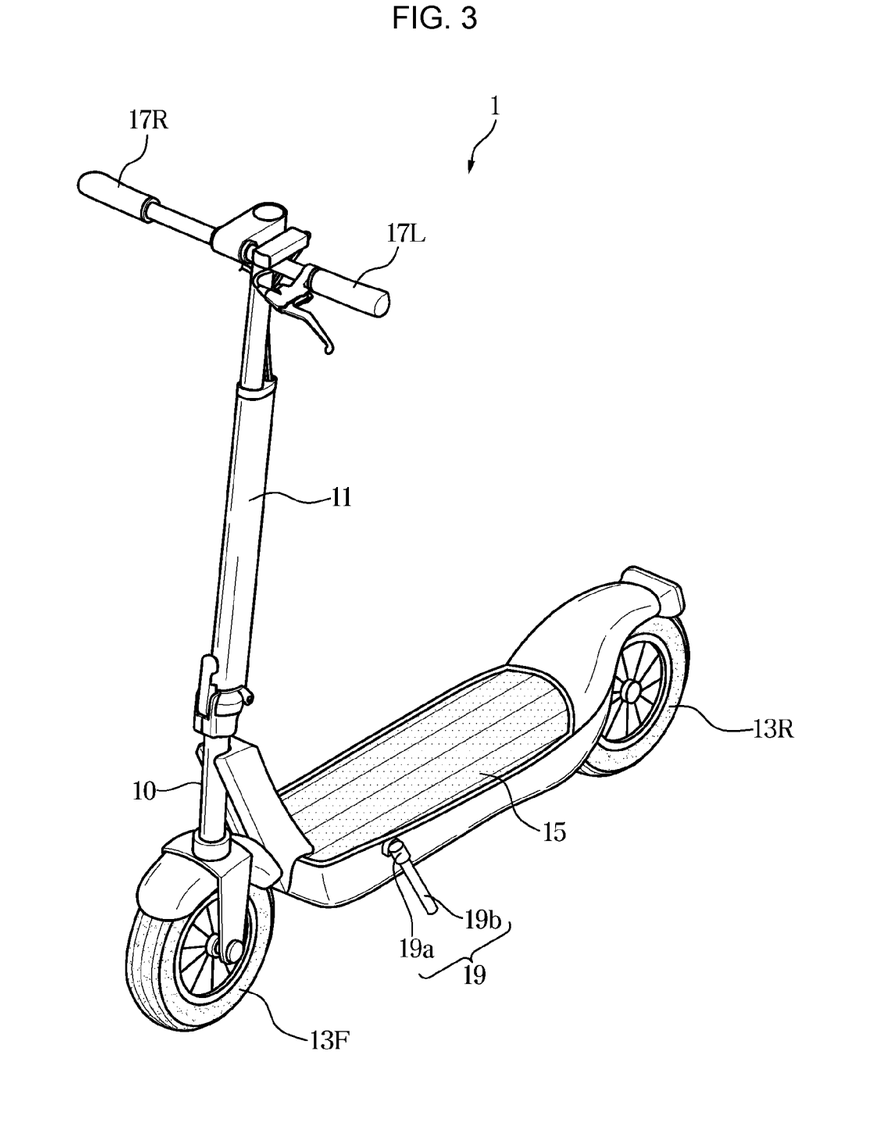
FIG. 3 is a view illustrating an appearance when a kickstand of a personal mobility is located in a parking position according to an exemplary embodiment.
Figure 4A:
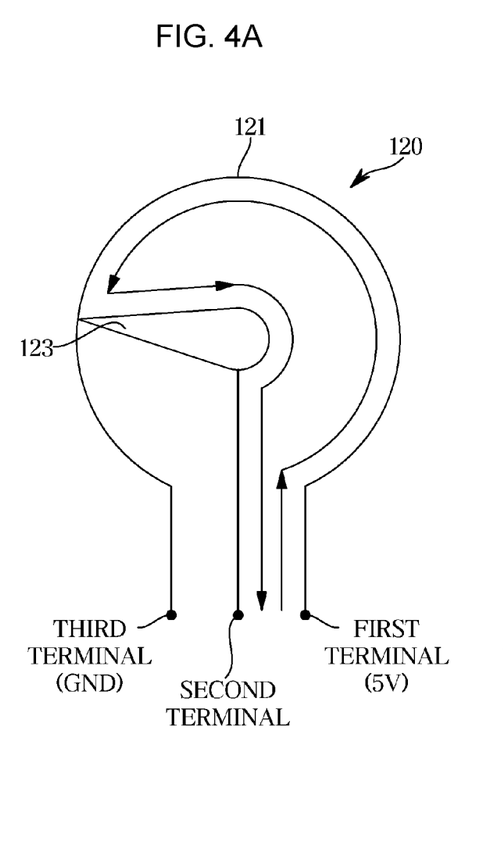
FIGS. 4A-4B are views illustrating a variable resistor according to an exemplary embodiment.
Figure 4B:
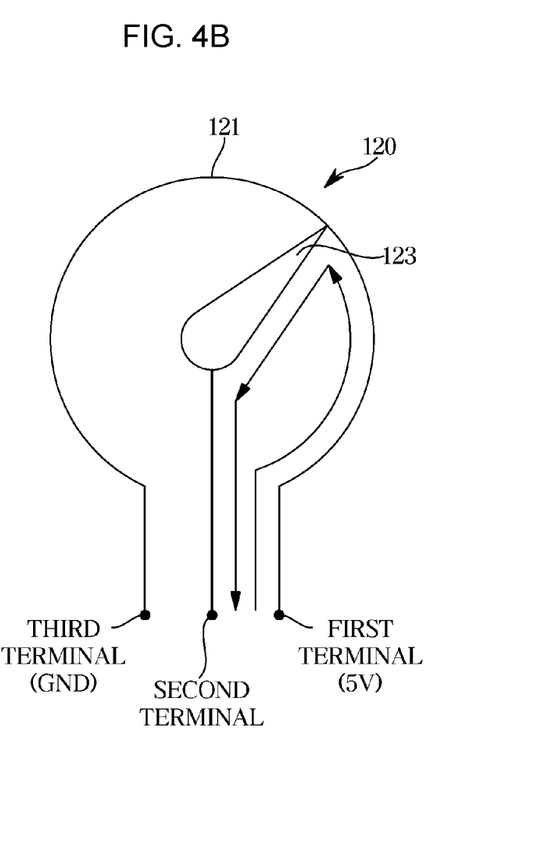

FIG. 3 is a view illustrating an appearance when a kickstand of a personal mobility is located in a parking position according to an exemplary embodiment. FIGS. 4A-4B are views illustrating a variable resistor according to an exemplary embodiment. Referring to FIG. 3, the kickstand 19 may be located in the parking position by rotating by applying a physical force from the user. The body 19*b* may contact the ground to support the main body 10 of the personal mobility 1.

In other words, the rotating shaft member 19*a* of the kickstand 19 rotates when a physical force is applied from the user, and thus, the body 19*b* may be unfolded toward the ground. At this time, the variable resistor 120 is provided on the axis of the kickstand 19 and may be configured to output a variable voltage that changes according to the position of the kickstand 19. In other words, the variable resistor 120 may be configured to output the first voltage when the kickstand 19 is located in the driving position. When the kickstand 19 is located in the parking position, a second voltage different in magnitude from the first voltage may be output.

Accordingly, the variable resistor 120, as illustrated in FIG. 4, may include a resistance line 121, and a slider 123 that is provided to be rotatable and whose position connected to the stance line 121 is changed according to rotation. The resistance line 121 may be provided in a circle around the axis of the slider 123, and may be located at a fixed point regardless of rotation of the rotating shaft member 19a. The slider 123 may be provided integrally with the rotating shaft member 19a, and may rotate to correspond to the rotation of the rotating shaft member 19a. Through this, when the slider 123 rotates, the position where the resistance line 121 and the slider 123 are connected may be changed.

Referring to FIGS. 4A and 4B, as the slider 123 rotates, as a length of the resistance line 121 located between a first terminal and a second terminal changes, the first terminal, the voltage (e.g., output voltage) between the first terminal and the second terminal may also vary. At this time, a voltage of a fixed magnitude (e.g., about 5V) may be applied between the first terminal and a third terminal. As described above, the variable resistor 120 may be configured to output a voltage that varies based on the position of the kickstand 19 using a physical feature in which the output voltage varies based on the position of the slider 123 moving in correspondence with the rotation axis of the kickstand 19. Through this, the controller 130 may be configured to determine the position of the kickstand 19 based on the output of the variable resistor 120. In other words, the controller 130 may be configured to determine whether the kickstand 19 is in the driving position or the parking position based on the magnitude of the voltage output from the variable resistor 120.

Figure 5:
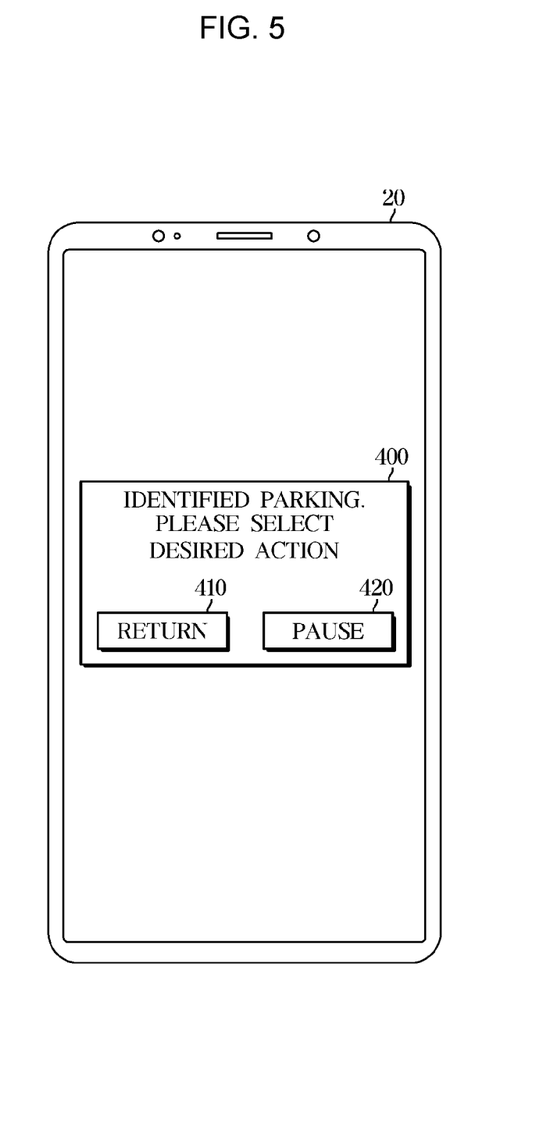
FIG. 5 is a view illustrating an example of a message transmitted by a personal mobility to a user terminal according to an exemplary embodiment.
Figure 6:
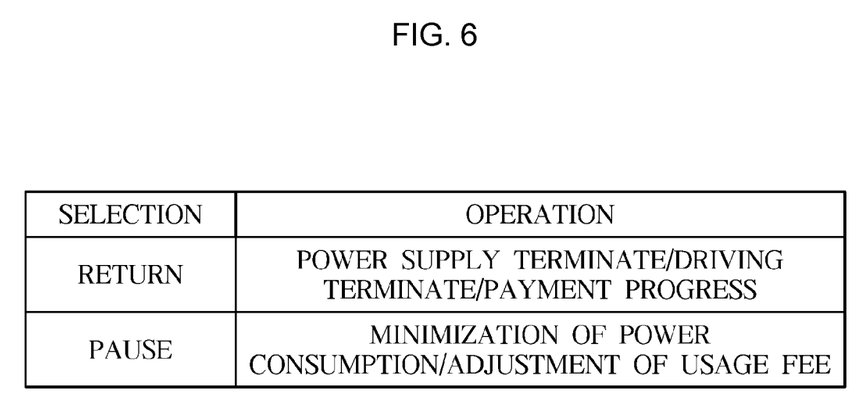
FIG. 6 is a view for describing a case in which a personal mobility operates based on user selection received from a user terminal according to an exemplary embodiment.

FIG. 5 is a view illustrating an example of a message transmitted by a personal mobility to a user terminal according to an exemplary embodiment. FIG. 6 is a view for describing a case in which a personal mobility operates based on user selection received from a user terminal according to an exemplary embodiment. The user may apply a force to the kickstand 19 so that the kickstand 19 is located in the parking position in the case of attempting to return after renting the personal mobility 1 or in a situation where the driving needs to be stopped for a while.

The user needs to input a series of information for returning the personal mobility via the user terminal. When the user does not carry out a process for returning the personal mobility, unintended usage fees may occur. In addition, there may be a situation in which the driving is paused while the user stays at a stopover, and even in this case, it may be unreasonable in terms of energy use or component wear to add a fee such as when driving. The controller 130 may be configured to adjust the power supply when the position of the kickstand 19 is the parking position. Particularly, when the position of the kickstand 19 is the parking position, the controller 130 may be configured to operate the communicator 110 to transmit the message confirming whether to return or pause, to the user terminal of the user who rented the personal mobility 1.

As illustrated in FIG. 5, the user terminal 20 may be configured to display a message 400 confirming whether return or pause, received from the personal mobility 1 through the display. In particular, the user may request the return of the personal mobility 1 by selecting a return 410 via the user terminal 20, and may select a pause 420 to request the pause in driving the personal mobility 1. The user terminal 20 may be configured to transmit a request that corresponds to the user's selection to the personal mobility 1. As described above, the personal mobility 1 may improve the user convenience by reminding the user that the kickstand 19 is located in the parking position, so that the user may return or pause, and prevent unnecessary usage fees.

As illustrated in FIG. 6, in response to receiving the message requesting return, the controller 130 may be configured to terminate the power supply. In other words, the controller 130 may be configured to terminate the power supply as part of the return to the personal mobility 1 in response to receiving the request to return the personal mobility 1 rented from the user terminal via the communicator 110. Particularly, the controller 130 may be configured to terminate the power supply so that the personal mobility 1 does not operate even in the user's operation by turning off the main battery 140 that supplies power to the configuration necessary for driving, such as the power device (e.g., motor) of the personal mobility 1. For example, the controller 130 may be configured to turn off the main battery 140 by opening the power supply switch (e.g., ignition switch) connected to the main battery 140.

Through this, the driving of the personal mobility 1 may be terminated, and the server may proceed with payment by charging the total usage fee to the user. However, even in this case, the auxiliary battery 150 may be configured to supply the power to the communicator 110, and through this, the communicator 110 may be configured to receive the rental confirmation message confirming that the personal mobility 1 from the server is rented. The controller 130 may be configured to turn on the main battery 104 again based on receiving the rental confirmation message.

As illustrated in FIG. 6, the controller 130 may be configured to minimize the power supply in response to receiving a message requesting the pause. In other words, the controller 130 may be configured to minimize the power supply by minimizing power consumption as part of the pause for driving when receiving the request for the pause of driving of the personal mobility 1 from the user terminal via the communicator 110. Particularly, the controller 130 may be configured to minimize the power supply by minimizing the power consumption in the communicator 110 by adjusting at least one of a communication speed or a data type to be transmitted according to the exemplary embodiment.

For example, the controller 130 may be configured to reduce the power consumption by adjusting the communication speed so that a communication period of the communicator 110 increases, and may be configured to reduce the power consumption by adjusting the data type to be transmitted to transmit only a small and essential data type. In addition, the controller 130 may be configured to minimize the power supply by pausing the power supply from the main battery 140 for charging the auxiliary battery 150 according to the exemplary embodiment.

In addition, the controller 130 may be configured to minimize the power supply by pausing the power supply from the main battery 140 by opening the power supply switch connected to the main battery 140. As described above, the personal mobility 1 may be configured to minimize the power supplied to the personal mobility 1 by reducing the power consumption when there is the request to pause driving.

In response to receiving the message requesting to pause, the controller 130 may be configured to adjust the usage fee per hour to decrease. In other words, in response to receiving the request for pausing of driving of the personal mobility 1 from the user terminal via the communicator 110, the controller 130 may be configured to adjust the usage fee to be lower than the usage fee as part of the pause for driving. For example, in response to receiving the message requesting to pause, the controller 130 may be configured to request the server to adjust the usage fee per hour in the decreasing direction. When returning the personal mobility 1, the server may be configured to calculate the usage fee when it is being paused to be lower than the usage fee when it is driving and determine the total usage fee.

As described above, when there is the request to pause driving, the personal mobility 1 may increase the user's satisfaction by adjusting the usage fee in a direction that reduces the usage fee in consideration of the fact that is uses less energy compared to driving and less wear of parts compared to driving. When the position of the kickstand 19 is changed from the parking position to the driving position, the controller 130 may be configured to terminate adjustment of the power supply.

Particularly, when the kickstand 19 is changed from the parking position to the driving position after the controller 130 minimizes the power supply according to the pause request, the controller 130 may be configured to terminate the adjustment of the power supply to minimize the power supply, and may be configured to operate the main battery 140 to supply power required for driving by minimizing the power supply. In other words, the controller 130 may be configured to operate the personal mobility 1 with the power supply before the pause request. In other words, when the kickstand 19 moves from the parking position to the driving position, the personal mobility 1 may provide without the user's inconvenience by normalizing the power supply that has been terminated or minimized without requesting a separate input from the user.

Hereinafter, a method of controlling the personal mobility 1 according to the exemplary embodiment will be described. The personal mobility 1 according to the above-described exemplary embodiment may be applied to the method of operating the personal mobility 1 described later. Therefore, the contents described with reference to FIGS. 1 to 6 are equally applicable to the method of operating the personal mobility 1 according to the exemplary embodiment even if there is no special mention.

Figure 7:
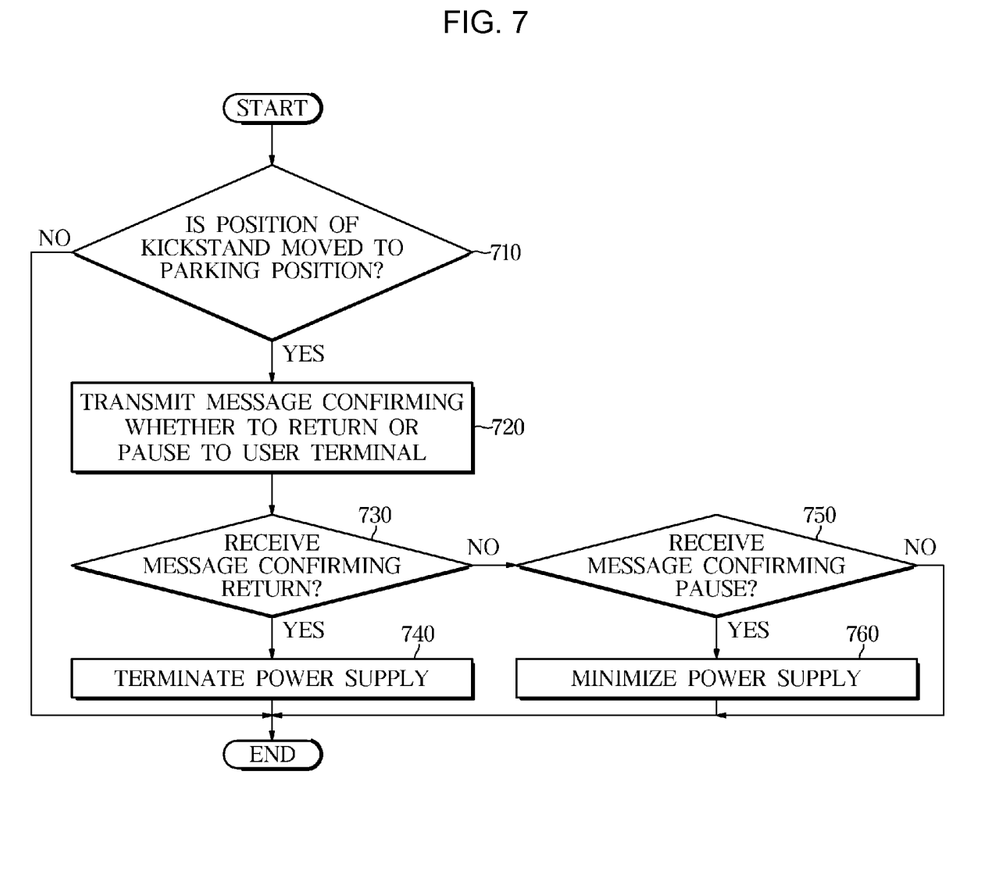
FIG. 7 is a flowchart illustrating a case in which power supply is adjusted based on a kickstand position in a method of controlling a personal mobility according to an exemplary embodiment.

FIG. 7 is a flowchart illustrating a case in which power supply is adjusted based on a kickstand position in a method of controlling a personal mobility according to an exemplary embodiment. Referring to FIG. 7, when the position of the kickstand 19 moves to the parking position (YES in 710), the personal mobility 1 may be configured to transmit the message confirming whether to return or pause the personal mobility, to the user terminal 20 (720).

When the personal mobility 1 receives the message requesting return (YES in 730), the personal mobility 1 may be configured to terminate the power supply (740). In other words, the controller 130 may be configured to terminate the power supply as part of the return to the personal mobility 1 in response to receiving the request to return the personal mobility 1 rented from the user terminal via the communicator 110. Particularly, the controller 130 may be configured to terminate the power supply so that the personal mobility 1 does not operate even in the user's operation by turning off the main battery 140 that supplies power to the configuration necessary for driving, such as the power device (e.g., motor) of the personal mobility 1. For example, the controller 130 may be configured to turn off the main battery 140 by opening the power supply switch (e.g., ignition switch) connected to the main battery 140.

However, even in this case, the auxiliary battery 150 may be configured to supply power to the communicator 110, and through this, the communicator 110 may be configured to receive the rental confirmation message confirming that the personal mobility 1 from the server has been rented. The controller 130 may be configured to turn on the main battery 104 again based on receiving the rental confirmation message. The personal mobility 1 may be configured to minimize the power supply (760) in response to receiving the message requesting the pause (YES in 750). In other words, the controller 130 may be configured to minimize the power supply by minimizing power consumption as part of the pause for driving when receiving the request for pause of driving of the personal mobility 1 from the user terminal via the communicator 110.

Particularly, the controller 130 may be configured to minimize the power supply by minimizing the power consumption in the communicator 110 by adjusting at least one of the communication speed or the data type to be transmitted according to the exemplary embodiment. In addition, the controller 130 may be configured to minimize power supply by pausing power supply from the main battery 140 for charging the auxiliary battery 150 according to the exemplary embodiment. The controller 130 may be configured to minimize the power supply by pausing the power supply from the main battery 140 by opening the power supply switch connected to the main battery 140.

In response to receiving the message requesting to pause, the personal mobility 1 may decrease the usage fee per hour. For example, in response to receiving the message requesting to pause, the controller 130 may be configured to request the server to adjust the usage fee per hour in a decreasing direction. When returning the personal mobility 1, the server may be configured to calculate the usage fee when it is being paused as lower than the usage fee when the personal mobility is being driven, and determine a total usage fee. When the position of the kickstand 19 is changed from the parking position to the driving position, the personal mobility 1 may be configured to terminate adjustment of the power supply.

Particularly, the controller 130 may be configured to terminate the adjustment of the power supply to minimize the power supply when the kickstand 19 is changed from the parking position to the driving position after minimizing the power supply according to a pause request, and may be configured to operate the main battery 140 to supply power required for driving by normalizing the power supply. In other words, the controller 130 may be configured to operate the personal mobility 1 with the power supply before the pause request. According to the personal mobility and the method of operating the personal mobility according to the exemplary embodiments, by adjusting the power supply based on the state of the kickstand, power efficiency may be improved and unintended usage fees may be prevented.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, and the like.

Exemplary embodiments of the disclosure have thus far been described with reference to the accompanying drawings. It should be apparent to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A personal mobility device, comprising: a main body; a kickstand provided rotatably on one end in the main body; a variable resistor provided on an axis of the kickstand, configured to output a voltage that varies based on a position of the kickstand; and a controller configured to adjust power supply when the position of the kickstand is a parking position.

2. The personal mobility according to claim 1, further comprising:
   a communicator,
   wherein the controller is configured to operate the communicator to transmit a message confirming whether to return the personal mobility or pause usage of the personal mobility to a user terminal when the position of the kickstand is the parking position.

3. The personal mobility according to claim 2, wherein, in response to receiving a message requesting to return, the controller is configured to terminate the power supply.

4. The personal mobility according to claim 2, wherein, in response to receiving a message requesting to pause, the controller is configured to minimize the power supply.

5. The personal mobility according to claim 4, wherein the controller is configured to adjust at least one of a communication speed or a data type to be transmitted to minimize power consumption in the communicator.

6. The personal mobility according to claim 4, further comprising:
   a main battery; and
   an auxiliary battery configured to supply power to the communicator.

7. The personal mobility according to claim 6, wherein the controller is configured to pause the power supply from the main battery for charging the auxiliary battery.

8. The personal mobility according to claim 6, wherein the controller is configured to pause the power supply from the main battery by opening a power supply switch connected to the main battery.

9. The personal mobility according to claim 2, wherein, in response to receiving a message requesting to pause, the controller is configured to adjust in a direction to decrease a usage fee per hour.

10. The personal mobility according to claim 1, wherein, in response to determining that the position of the kickstand is changed from t parking position to a driving position, the controller is configured to terminate adjustment to the power supply.

11. The personal mobility according to claim 1, wherein the variable resistor includes a resistance line; and a slider provided to be rotatable in response to a rotation of the axis of the kickstand, configured to change the position connected to the resistance line according to the rotation.

12. A method of operating a personal mobility device, the personal mobility device including a main body, a kickstand provided rotatably on one end in the main body, and a variable resistor provided on an axis of the kickstand, configured to output a voltage that varies according to a position of the kickstand, the method comprising: outputting, by the variable resistor, the voltage that varies based on the position of the kickstand, adjusting, by a controller, power supply when the position of the kickstand is a parking position.

13. The method according to claim 12, wherein the personal mobility further includes a communicator, and wherein the adjusting of the power supply includes:
   operating, by the controller, the communicator to transmit a message confirming whether to return the personal mobility or pause usage of the personal mobility to a user terminal when the position of the kickstand is the parking position.

14. The method according to claim 13, wherein the adjusting of the power supply includes:
   in response to receiving a message requesting to return, terminating, by the controller, the power supply.

15. The method according to claim 13, wherein the adjusting of the power supply includes:
   in response to receiving a message requesting to pause, minimizing, by the controller, the power supply.

16. The method according to claim 15, wherein the minimizing of the power supply includes:
   adjusting, by the controller, at least one of a communication speed or a data type to be transmitted to minimize power consumption in the communicator.

17. The method according to claim 15, wherein the personal mobility further includes a main battery, and an auxiliary battery configured to supply power to the communicator.

18. The method according to claim 17, wherein the minimizing of the power supply includes:
   pausing, by the controller, the power supply from the main battery for charging the auxiliary battery.

19. The method according to claim 17, wherein the minimizing of the power supply includes:
   pausing, by the controller, the power supply from the main battery by opening a power supply switch connected to the main battery.

20. The method according to claim 13, further comprising:
   in response to receiving a message requesting to pause, decreasing, by the controller, a usage fee per hour.

* * * * *